United States Patent [19]

Kanazawa et al.

[11] 4,224,211

[45] Sep. 23, 1980

[54] HEAT CURABLE COATING COMPOSITIONS COMPRISING PARTIALLY HYDROLYZED SILICON COMPOUNDS, ACRYLIC COPOLYMERS AND ETHERATED METHYLOLMELAMINE

[75] Inventors: Hiroyuki Kanazawa; Mikio Futagami, both of Niihama, Japan

[73] Assignee: Sumitomo Chemical Company, Limited, Osaka, Japan

[21] Appl. No.: 935,381

[22] Filed: Aug. 21, 1978

Related U.S. Application Data

[63] Continuation of Ser. No. 734,877, Oct. 22, 1976, abandoned.

[30] Foreign Application Priority Data

Oct. 24, 1975 [JP] Japan ................................ 50-128582

[51] Int. Cl.$^2$ ......................... C08K 5/01; C08K 5/05; C08K 5/06; C08K 5/09
[52] U.S. Cl. ......................... 260/31.2 R; 260/31.2 N; 260/33.2 SB; 260/33.4 SB; 260/33.6 SB; 428/447; 525/100; 525/101
[58] Field of Search ............... 260/31.2 R, 31.2 N, 260/33.2 SB, 33.4 SB, 33.6 SB, 825; 525/100, 101

[56] References Cited

U.S. PATENT DOCUMENTS

| | | | |
|---|---|---|---|
| 3,389,114 | 6/1968 | Burzynski et al. | 260/32.8 |
| 3,389,121 | 6/1968 | Burzynski et al. | 260/46.5 |
| 3,451,838 | 6/1969 | Burzynski et al. | 117/33.3 |
| 3,460,980 | 8/1969 | Burzynski | 117/132 |
| 3,468,836 | 9/1969 | Sekmakas | 260/33.6 |
| 3,554,698 | 1/1971 | Burzynski et al. | 23/182 |
| 3,894,881 | 7/1975 | Suzuki et al. | 106/287 SB |
| 4,028,300 | 6/1977 | Wake et al. | 260/31.2 R |

*Primary Examiner*—Stanford M. Levin
*Attorney, Agent, or Firm*—Birch, Stewart, Kolasch and Birch

[57] ABSTRACT

A coating composition useful for improving the surface properties, such as surface hardness and chemical resistance, of plastic products, wooden products, metallic products, or the like, which comprises (A) partially hydrolyzed silicon compounds consisting essentially of copartial hydrolyzates of an organic silicon compound of the formula: $R_nSi(OR')_{4-n}$ wherein n is 1 to 3, R is a hydrocarbon group and R' is an alkyl, and a tetraalkoxysilane, or a mixture of partial hydrolyzates of each organic silicon compound and tetraalkoxysilane, said partial hydrolyzate of the organic silicon compound being contained in a larger ratio to the partial hydrolyzate of the tetraalkoxysilane, (B) an acrylic copolymer and an etherated methylolmelamine, and (C) a solvent. The coating composition can give a transparent and hard coating film having excellent boiling water resistance, heat cycle resistance and weatherability even under severe conditions.

5 Claims, No Drawings

HEAT CURABLE COATING COMPOSITIONS COMPRISING PARTIALLY HYDROLYZED SILICON COMPOUNDS, ACRYLIC COPOLYMERS AND ETHERATED METHYLOLMELAMINE

This application is a continuation, of copending application Ser. No. 734,877, filed on Oct. 22, 1976, now abandoned.

The present invention relates to a coating composition, more particularly to a coating composition useful for improving the surface properties, such as surface hardness and chemical resistance, of plastics products, wooden products, metallic products, or the like, and which can give a coating film having excellent boiling water resistance, heat cycle resistance and weatherability onto the products.

There have, hitherto, been widely used various products made of plastics materials, for instance, made of thermoplastic resins, such as polycarbonate, polymethyl methacrylate, polystyrene and polyvinyl chloride. These materials are often chosen because of their excellent characteristics, such as light weight, easy processability and impact resistance. However, these materials have a soft surface which is readily injured and furthermore is easily swollen or dissolved by solvent contact.

Various methods have been proposed for improving these defects in plastics articles, but using these methods, the defects mentioned above can not be completely eliminated, and there has never been found any product having satisfactory properties.

For the purpose of eliminating these defects in the conventional methods, the present inventors have proposed a coating composition comprising a partially hydrolyzed tetraalkoxysilane, a partial hydrolyzate of an organic silicon compound of the formula: $R_nSi(OR')_{4-n}$ wherein n is an integer of from 1 to 3, R is a hydrocarbon group having from 1 to 6 carbon atoms and R' is an alkyl group having from 1 to 4 carbon atoms (hereinafter, referred to as "organic silicon compound"), an acrylic copolymer, and an etherated methylolmelamine (Japanese Patent Application No. 10632/1974, U.S. Ser. No. 613,035, now U.S. Pat. No. 4,028,300). The above coating composition, wherein the partially hydrolyzed tetraalkoxysilane is contained in a larger ratio to that of the partial hydrolyzate of the organic silicon compound as the silicon component, can give a coating film having excellent abrasion resistance and chemical resistance and further having improved boiling water resistance, heat cycle resistance and antistatic properties. However, when the products coated by the composition is kept under severe conditions, such as in a high boiling water, or at a place where the atmospheric temperature is rapidly changed from higher to lower or from lower to higher, it tends to occur blushing, blister, peeling, crack, etc. of the coating film, and even if such abnormal apperances are not observed, it tends to have inferior chemical resistance and abrasion resistance.

In order to improve further the boiling water resistance, heat cycle resistance and weatherability of the coating film by the above coating composition, the present inventors have intensively studied effects on the properties of the coating film in accordance with the change of the ratio of the partially hydrolyzed tetraalkoxysilane to the partial hydrolyzate of the organic silicon compound in the silicon component of the above coating composition. As the result, it has now been found that the boiling water resistance, heat cycle resistance and weatherability of the coating film can be further improved by enlarging the ratio of the partial hydrolyzate of the organic silicon compound to the partially hydrolyzed tetraalkoxysilane while the coating film has still an abrasion resistance enough for practical use thereof and further that the flexibility of the coating film, which is insufficient when the composition comprises merely the silicon components, can be improved by incorporating an acrylic copolymer and an etherated methylolmelamine.

An object of the present invention is to provide a further improved coating composition which can give a coating film having excellent boiling water resistance, heat cycle resistance and weatherability as well as abrasion resistance.

Another object of the invention is to provide a coating composition containing a higher ratio of a partial hydrolyzate of an organic silicon compound to a partially hydrolyzed tetraalkoxysilane as the silicon component.

These and other objects of the invention will be apparent from the following description.

The coating composition of the present invention comprises:

(A) partially hydrolyzed silicon compounds consisting essentially of co-partial hydrolyzates of an organic silicon compound of the formula: $R_nSi(OR')_{4-n}$ wherein n is an integer of from 1 to 3, R is a hydrocarbon group having from 1 to 6 carbon atoms and R' is an alkyl having from 1 to 4 carbon atoms, and a tetraalkoxysilane, or a mixture of partial hydrolyzates of each organic silicon compound and tetraalkoxysilane, said partial hydrolyzate of tetraalkoxysilane being contained in an amount of 5 to 99 parts by weight (calculated as $SiO_2$) per 100 parts by weight (calculated as $R_nSiO_{4-n/2}$) of the partial hydrolyzate of the organic silicon compound of the formula: $R_nSi(OR')_{4-n}$, (B) 5 to 200 parts by weight of an acrylic copolymer which is a copolymer of an alkyl (meth)acrylate (i.e. an alkyl acrylate and/or an alkyl methacrylate) and a hydroxyalkyl (meth)acrylate (i.e. a hydroxyalkyl acrylate and/or a hydroxyalkyl methacrylate), and 0 to 150 parts by weight of an etherated methylolmelamine per 100 parts by weight (calculated as $R_nSiO_{4-n/2}$) of the partial hydrolyzate of the organic silicon compound of the formula: $R_nSi(OR')_{4-n}$ in (A), respectively, which are dissolved in a solvent.

The coating composition of the present invention can form a coating film having further improved boiling water resistance, heat cycle resistance and weatherability by enlarging the ratio of the partial hydrolyzate of the organic silicon compound to the partial hydrolyzed tetraalkoxysilane within the coating film has still an abrasion resistance enough for practical use thereof and further an enough flexibility by incorporating the acrylic copolymer and the etherated methylolmelamine.

Moreover, the present coating composition has an excellent adhesion to acrylic substrates since the acrylic copolymer is contained, and hence, it can form a coating film having an excellent adhesion onto the substrates made of a homopolymer or copolymer of methyl methacrylate without any pretreatment. Besides, the addition of the etherated methylolmelamine is effective for giving both excellent hardness and flexibility to the coating film.

In the present specification and claims, "alkoxy" in the tetraalkoxysilane denotes an alkoxy having from 1 to 4 carbon atoms, such as methoxy, ethoxy, propoxy or butoxy. "hydrocarbon group" for R in the organic silicon compound of the formula: $R_nSi(OR')_{4-n}$ denotes an alkyl having 1 to 6 carbon atoms, such as methyl, ethyl, propyl, butyl, pentyl or hexyl, an alkenyl having 2 to 6 carbon atoms, such as vinyl, allyl or propenyl, and phenyl, and "alkyl" for R' denotes an alkyl having from 1 to 4 carbon atoms, such as methyl, ethyl, propyl or butyl.

The partially hydrolyzed silicon compounds can be prepared by hydrolyzing the tetraalkoxysilane and the organic silicon compound of the formula: $R_nSi(OR')_{4-n}$ separately or together in a suitable solvent (e.g. a mixed solvent of water and an alcohol) in the presence of an acid (e.g. hydrochloric, phosphoric and sulfuric acid; oxalic and maleic acid; acetic and formic acid). The water is used in an amount of 0.5 mole or more of total alkoxy groups contained in the tetraalkoxysilane and the organic silicon compound. Alternatively, the partially hydrolyzed silicon compounds may be prepared by hydrolyzing directly a silicon chloride of the formula: $SiCl_4$ or $R_nSiCl_{4-n}$. Generally speaking, it is more preferable to cohydrolyze the mixture of the silicon compounds rather than hydrolyzing separately each of the silicon compounds and mixing the resultants. Particularly, in case of the organic silicon compound of the formula: $R_nSi(OR')_{4-n}$ wherein n is 2 or 3, it is more preferably mixed with the tetraalkoxysilane and then cohydrolyzed.

The partially hydrolyzed silicon compounds (A) thus obtained contains preferably 5 to 99, more preferably 20 to 80, parts by weight (calculated as $SiO_2$) of the partially hydrolyzed tetraalkoxysilane and 100 parts by weight (calculated as $R_nSiO_{4-n/2}$) of at least one partial hydrolyzate of the organic silicon compound of the formula: $R_nSi(OR')_{4-n}$. When less than 5 parts by weight of the partially hydrolyzed tetraalkoxysilane are present, the hardness of the coating film is lowered and the abrasion resistance is lost so that the product can not be practically used. On the other hand, when more than 99 parts by weight are present, it tends to show inferior boiling water resistance, heat cycle resistance and weatherability of the coating film.

The acrylic copolymer used in the present invention may be produced by bulk-polymerization, emulsion polymerization, suspension-polymerization or solution-polymerization of an alkyl (meth)acrylate and a hydroxyalkyl (meth)acrylate in the presence of a radical polymerization initiator (e.g. azobisisobutyronitrile, benzoyl peroxide, di-tert.-butyl peroxide, etc.).

Suitable examples of the alkyl (meth)acrylate are acrylic or methacrylic acid esters of alcohols having from 1 to 18 carbon atoms, particularly, ethyl acrylate or methacrylate, propyl acrylate or methacrylate, butyl acrylate or methacrylate, 2-ethylhexyl acrylate or methacrylate, lauryl acrylate or methacrylate.

Suitable examples of the hydroxyalkyl (meth)acrylate are 2-hydroxyethyl acrylate or methacrylate, hydroxypropyl acrylate or methacrylate, hydroxybutyl acrylate or methacrylate, glycerol monoacrylate or monomethacrylate.

The ratio of the alkyl (meth)acrylate and the hydroxyalkyl (meth)acrylate in the acrylic copolymer is not critical, but is preferably in the range of 1/10 to 10/1 by weight in viewpoint of the properties of the coating film produced from the composition, such as the adhesion of the coating film to the substrate and the flexibility of the coating film.

The amount of the acrylic copolymer to be employed is preferably in the range of from 5 to 200 parts by weight per 100 parts by weight (calculated as $R_nSiO_{4-n/2}$) of the partial hydrolyzate of the organic silicon compound of the formula: $R_nSi(OR')_{4-n}$. When the amount of the acrylic copolymer is less than 5 parts by weight, the coating film produced from the coating composition is inferior in its heat cycle resistance and tends to craze, and on the other hand, when it is more than 200 parts by weight, the hardness of the coating film deteriorates and it tends to occur blushing of the coating film when it is immersed in a boiling water.

The etherated methylolmelamines used in the present invention can be produced by the known methods and many products thereof are commercially available. Suitable examples thereof are hexa(alkoxymethyl)melamines, such as hexa(methoxymethyl)melamine, hexa(ethoxymethyl)melamine, hexa(propoxymethyl)melamine, hexa(isopropoxymethyl)melamine, hexa(butoxymethyl)melamine, or hexa(cyclohexyloxymethyl)melamine.

The amount of the etherated methylolmelamine to be employed is preferably in the range of from 0 to 150 parts by weight per 100 parts by weight (calculated as $R_nSiO_{4-n/2}$) of the partial hydrolyzate of the organic silicon compound of the formula: $R_nSi(OR')_{4-n}$. When the amount of the etherated methylolmelamine is more than 150 parts by weight, the adhesion of the coating film, particularly the adhesion in boiling water, deteriorates.

The solvent used in the present composition may comprise one or more alcohols, ketones, esters, ethers, cellosolves, halide compounds, carboxylic acids, aromatic compounds, or the like, and the most suitable one may be elected in accordance with the kind of polymer substrates to be coated, the evaporation rate of the solvent, or the like, and the solvent is admixed with the other components of the coating composition in a wide range of the ratio thereof. Among the solvents, lower alkylcarboxylic acids, such as formic acid, acetic acid and propionic acid have the effect of increasing the adhesion between the coating film and the substrate. Suitable examples of the solvent are the combination of lower alcohols (e.g. methanol, ethanol, propanol, or butanol), lower alkylcarboxylic acids (e.g. formic acid, acetic acid, or propionic acid), aromatic compounds (e.g. benzene, toluene, or xylene) and cellosolves (e.g. methyl cellosolve, or butyl cellosolve). The amount of the solvent is not critical and may be appropriately selected in accordance with the required thickness of the coating film, the coating method or the like.

The composition of the present invention may be applied to a substrate and then calcined at a temperature of 70° C. or higher to give a cured coating film. A cure promoting catalyst, such as one or more acids (e.g. hydrochloric acid, toluenesulfonic acid), organic amines (e.g. triethylamine, tributylamine), metal carboxylates (e.g. sodium acetate, sodium propionate), metal thiocyanates (e.g. potassium thiocyanate, sodium thiocyanate), metal nitrites (e.g. sodium nitrite, potassium nitrite), or organic tin compounds (e.g. dibutyl tin di-2-ethylhexoate, dibutyl tin dilaurate) may also be added, for lowering the curing temperature or for shortening the curing time.

A surfactant may also be added to the present coating composition in order to prevent the deterioration of the surface properties of the coating film, such as orange peel and shrinkage, particularly when a thick coating film is required, and furthermore, in order to prevent the runaway of the composition when applied. Especially, when a small amount of a block copolymer of an alkylene oxide and dimethylsiloxane is added to the composition, a good coating film can be produced.

The cure promoting catalyst and surfactant need be used only in a small amount and usually it is sufficient to use up to 5% by weight of each on the basis of the solid component of the composition.

Moreover, if desired, other additives such as ultraviolet absorbers, colorants (e.g. pigments) or antistatic agents may be added to the present coating composition.

The composition of the present invention can be applied to a substrate by conventional methods, such as spray coating, immersion, brushing, or the like. After coating, the composition should be calcined (cured) at a temperature of 70° C. or higher to give a coating film which is normally transparent and has excellent hardness, water resistance, boiling water resistance, chemical resistance, heat cycle resistance and weatherability.

The composition of the present invention is particularly useful for coating acrylic substrates, but may be also used for coating various other substrates, such as plastics other than acrylics (e.g. polycarbonate resin, polystyrene resin, polyvinyl chloride resin, acrylonitrilebutadiene-styrene resin, polyamide resin and polyester resin), paper, wood, metals and ceramics. When particularly good adhesion of the coating film to the substrate is required, it is useful to previously undercoat the substrate with an acrylic primer, such as a solution of polymethyl methacrylate in a solvent, a conventional acrylic lacquer or a thermosetting acrylic paint.

The present invention is illustrated by the following Examples but is not limited thereto. In the Examples, % means % by weight unless otherwise specified.

EXAMPLES 1 TO 11

(1) Preparation of a solution of cohydrolyzation products of tetraethoxysilane and methyltriethoxysilane (Component I):

Into a vessel for hydrolyzation equipped with a reflux condenser, there were charged isopropyl alcohol (68 g), tetraethoxysilane (38 g) and methyltriethoxysilane (72 g). To the mixture was further added 0.05 N hydrochloric acid (36 g), and the mixture was refluxed with stirring for 5 hours to effect cohydrolysis. After the reaction, the mixture was cooled to room temperature to give a solution of co-partially hydrolyzed products. The resulting solution contained a partial hydrolyzate of tetraethoxysilane (5.1%, calculated as $SiO_2$) and a partial hydrolyzate of methyltriethoxysilane (12.6%, calculated as $CH_3SiO_{1.5}$).

(2) Preparation of a solution of cohydrolyzation products of tetraethoxysilane and methyltriethoxysilane (Component II):

In the same manner as described in the above item (1), there was produced a solution of cohydrolyzation products excepting that tetraethoxysilane (10 g) and methyltriethoxysilane (100 g) were used. The resulting solution contained a partial hydrolyzate of tetraethoxysilane (1.3%, calculated as $SiO_2$) and a partial hydrolyzate of methyltriethoxysilane (17.5%, calculated as $CH_3SiO_{1.5}$).

(3) Preparation of a solution of cohydrolyzation products of tetraethoxysilane and dimethyldiethoxysilane (Component III):

Tetraethoxysilane (20 g) and dimethyldiethoxysilane (69 g) were dissolved in isopropyl alcohol (89 g), and thereto was added 0.05 N hydrochloric acid (36 g), and the mixture was stirred at room temperature to effect hydrolysis. After the reaction, the mixture was matured at room temperature for 20 hours or more at room temperature. The resulting solution contained a partial hydrolyzate of tetraethoxysilane (2.7%, calculated as $SiO_2$) and a partial hydrolyzate of dimethyldiethoxysilane (16.1%, calculated as $(CH_3)_2SiO$).

(4) Preparation of a solution of cohydrolyzation products of tetraethoxysilane, methyltriethoxysilane and trimethylethoxysilane (Component IV):

Tetraethoxysilane (48 g), methyltriethoxysilane (45 g) and trimethylethoxysilane (9 g) were dissolved in ethyl alcohol (76 g), and thereto was added 0.05 N hydrochloric acid (36 g), and the mixture was stirred at room temperature to effect hydrolysis. After the reaction, the mixture was matured at room temperature for 20 hours or more at room temperature. The resulting solution contained a partial hydrolyzate of tetraethoxysilane (6.4%, calculated as $SiO_2$), a partial hydrolyzate of methyltriethoxysilane (7.9%, calculated as $CH_3SiO_{1.5}$) and a partial hydrolyzate of trimethylethoxysilane (2.8%, calculated as $(CH_3)_3SiO_{0.5}$).

(5) Preparation of acrylic copolymers:

(a) Butyl acrylate (40 g), 2-hydroxyethyl methacrylate (10 g) and azobisisobutyronitrile (0.5 g) were dissolved in ethyl alcohol (300 g), and the mixture was stirred at 70° C. for 5 hours under nitrogen gas to effect polymerization. After the reaction was completed, the reaction mixture was poured into petroleum ether and thereby the unreacted monomers are removed to give Copolymer (a).

(b) In the same manner as described in the above (a), ethyl acrylate (50 g) and 3-hydroxypropyl methacrylate (10 g) were copolymerized to give Copolymer (b).

(6) Preparation of compositions of the invention:

The above-obtained Components I, II, III and/or IV, the Copolymer (a) and/or (b) and hexa(butoxymethyl)-melamine were admixed in the ratios shown in Table 1. The mixture was dissolved in a solvent consisting of n-butanol (60 parts by weight), acetic acid (40 parts by weight) and xylene (20 parts by weight), and thereto were added sodium acetate (0.4 part by weight) and a surfactant (NUC Silicone Y 7006, made by Nippon Unicar Co., 0.2 part by weight) to give the compositions.

(7) Coating and tests of the properties of the coated products:

Polymethyl methacrylate sheet (thickness: 3 mm, trade name: Sumipex-000, made by Sumitomo Chemical Company, Limited) was washed with water and ethanol, and coated with the above-obtained compositions. The coated products were cured with a hot-air drier at 90° C. for 3 hours.

The polymethyl methacrylate sheet thus coated were subjected to the following tests:

(i) Adhesion:

A number of nicks which reach to the substrate were made in the coating film by a steel knife so that a hundred cells having an area of 1 mm² were formed, and thereon was bonded a cellophane tape (trade name: Cellotape, made by Sekisui Chemical Co., Ltd.). The cellophane tape was then peeled off at an angle of 90° to the surface. The adhesion of the coating film was evaluated by the number of the remaining cells.

(ii) Abrasion resistance:

The surface of the coating film was rubbed 20 times with a filter paper (trade name: Toyoroshi No. 5 C, made by Toyoroshi K. K.) at a load of 10 kg/cm². The abrasion resistance was evaluated according to the following scale.

A: No scratch made on the surface by rubbing.
B: A few scratches made by rubbing.
C: Scratches made by rubbing.

The polymethyl methacrylate sheet with no coating was ranked as C.

(iii) Boiling water resistance:

The surfaces to be tested were immersed in boiling water at 90° C. for 2 hours, and thereafter, the state of the coating film was observed.

(iv) Heat cycle test:

A sample was kept in a hot-air drier at 80° C. for 2 hours and then in an ice-sodium chloride solution at −20° C. for 2 hours. This was repeated ten times, and thereafter, the state of the coating film was observed.

(v) Weatherability:

A sample was irradiated with a sunshaine weather meter (WE-SUN-HCA-1 type, made by Suga Shikenki K. K.) for 500 hours, and thereafter, the state of the coating film was observed.

REFERENCE EXAMPLES 1 TO 4

In the same manner as described in the Examples 1 to 11, Reference coating compositions were also prepared and subjected to the various tests.

The results are shown in the following Table 1.

TABLE 1

| Example No. | Component (A) | | | | Component (B) | | |
| --- | --- | --- | --- | --- | --- | --- | --- |
| | Compound I (part by weight) | Compound II (part by weight) | Compound III (part by weight) | Compound IV (part by weight) | Copolymer Kind | Copolymer Amount (part by weight) | Melamine* Amount (part by weight) |
| 1 | 100 | — | — | — | a | 20 | — |
| 2 | 100 | — | — | — | b | 15 | 5 |
| 3 | 50 | 50 | — | — | a | 10 | — |
| Ref.Ex. 1 | 100 | — | — | — | — | — | — |
| 4 | — | 100 | — | — | a | 10 | 5 |
| 5 | — | 100 | — | — | b | 10 | 5 |
| 6 | — | 50 | 50 | — | a | 5 | 5 |
| Ref.Ex. 2 | — | 100 | — | — | — | — | — |
| 7 | — | — | 100 | — | a | 5 | 5 |
| 8 | — | — | 100 | — | b | 5 | — |
| 9 | — | — | 100 | — | a | 5 | — |
| Ref.Ex. 3 | — | — | 100 | — | — | — | — |
| 10 | — | — | — | 100 | a | 20 | — |
| 11 | — | 50 | — | 50 | a | 10 | — |
| Ref.Ex. 4 | — | — | — | 100 | — | — | — |

| Example No. | Properties of the coated products | | | | | |
| --- | --- | --- | --- | --- | --- | --- |
| | Appearance of the coating film after curing | Adhesion | Abrasion resistance | Boiling water resistance | Heat cycle test | Weatherability** |
| 1 | Excellent | 100/100 | A | Excellent | Excellent | Excellent |
| 2 | Excellent | 100/100 | A | Excellent | Excellent | Excellent |
| 3 | Excellent | 100/100 | A | Excellent | Excellent | Excellent |
| Ref.Ex. 1 | crazing | 100/100 | A | Increase of crazing | Increase of crazing | Increase of crazing |
| 4 | Excellent | 100/100 | A | Excellent | Excellent | Excellent |
| 5 | Excellent | 100/100 | A | Excellent | Excellent | Excellent |
| 6 | Excellent | 100/100 | A-B | Excellent | Excellent | Excellent |
| Ref.Ex. 2 | Crazing | 100/100 | A | Increase of crazing | Increase of crazing | Increase of crazing |
| 7 | Excellent | 100/100 | A | Excellent | Excellent | Excellent |
| 8 | Excellent | 100/100 | A | Excellent | Excellent | Excellent |
| 9 | Excellent | 100/100 | A | Excellent | Excellent | Excellent |
| Ref.Ex. 3 | Excellent | 100/100 | A | some crazings | some crazings | some crazings |
| 10 | Excellent | 100/100 | A-B | Excellent | Excellent | Excellent |
| 11 | Excellent | 100/100 | A | Excellent | Excellent | Excellent |
| Ref.Ex. 4 | Crazing | 100/100 | A | Increase of crazing | Increase of crazing | Increase of crazing |

[Remarks]
*Melamine is hexa(butoxymethyl)melamine.
**The abrasion resistance of the coating film after the test for weatherability was good as before the test.

What is claimed is:

1. A heat curable solution of a coating composition which provides a cured coating film having improved surface properties by calcining, comprising:
   (A) solvent-soluble, partially hydrolyzed silicon compounds consisting essentially of co-partial hydrolyzates of an organic silicon compound of the formula:

wherein n is an integer of from 1 to 3, R is an alkyl group having from 1 to 6 carbon atoms or phenyl, and R' is an alkyl having from 1 to 4 carbon atoms, and a tetraalkoxysilane wherein the alkoxy group is a member selected from the group consisting of methoxy, ethoxy, propoxy and butoxy, or a mixture of partial hydrolyzates of each organic silicon compound and tetraalkoxysilane, said partial hydrolyzate of tetraalkoxysilane being contained in an amount of from 5 to 99 parts by weight (calculated as $SiO_2$) per 100 parts by weight (calculated as $R_nSiO_{4-n/2}$) of the partial hydrolyzate of the organic silicon compound of the formula:

$$R_nSi(OR')_{4-n}$$

(B) five to 200 parts by weight of an acrylic copolymer which is a copolymer of an alkyl (meth)acrylate and a hydroxyalkyl (meth)acrylate, and 0 to 150 parts by weight of an etherated methylolmelamine per 100 parts by weight (calculated as $R_nSiO_{4-n/2}$) of the partial hydrolyzate of the organic silicon compound of the formula:

$$R_nSi(OR')_{4-n}$$

in (A),
(C) an additive selected from the group consisting of an acid, an organic amine, a metal carboxylate, a metal thiocyanate, a metal nitrite and an organic tin compound, and
(D) a solvent.

2. The coating composition according to claim 1, wherein the organic silicon compound is an organic silicon compound of the formula: $RSi(OR')_3$ wherein R is a hydrocarbon group having from 1 to 6 carbon atoms and R' is an alkyl group having from 1 to 4 carbon atoms.

3. The coating composition according to claim 1, wherein the partially hydrolyzed silicon compounds are those obtained by co-hydrolyzing the mixture of at least one tetraalkoxysilane and at least one organic silicon compound of the formula: $R_nSi(OR')_{4-n}$ wherein n is an integer of from 1 to 3, R is a hydrocarbon group having from 1 to 6 carbon atoms and R' is an alkyl group having from 1 to 4 carbon atoms with an acid in a solvent.

4. The coating composition according to claim 1, wherein the ratio of the alkyl (meth)acrylate and the hydroxyalkyl (meth)acrylate in the acrylic copolymer in the component (B) is in the range of 1/10 to 10/1 by weight.

5. The coating composition according to claim 1, wherein the solvent is a member selected from the group consisting of methanol, ethanol, propanol, butanol, formic acid, acetic acid, propionic acid, benzene, toluene, xylene, methyl cellosolve, butyl cellosolve, and the mixtures thereof.

* * * * *